Nov. 27, 1951      S. RUBEN      2,576,266

ELECTROLYTE FOR ALKALINE DRY CELLS

Filed Dec. 23, 1947

INVENTOR
Samuel Ruben
BY
Nicholas Laugs
ATTORNEY

Patented Nov. 27, 1951

2,576,266

UNITED STATES PATENT OFFICE 2,576,266

ELECTROLYTE FOR ALKALINE DRY CELLS

Samuel Ruben, New Rochelle, N. Y.

Application December 23, 1947, Serial No. 793,407

8 Claims. (Cl. 136—157)

This invention relates to alkaline dry cells, and, more particularly, to the method of making an improved electrolyte for such cells.

In my U. S. Patent 2,422,045, relating to an Alkaline Dry Cell, there is disclosed a sealed alkaline primary cell having an amalgamated zinc anode, a cathode formed of a conductive body containing an electrolytically reducible oxygen-yielding compound (such as mercuric or silver oxide) and an immobilized electrolyte comprising an aqueous solution of an alkali metal hydroxide (such as potassium hydroxide) containing a substantial quantity of alkali metal zincate. The presence of the zincate in the electrolyte, in combination with other features described in the said patent, prevents or strongly inhibits any tendency for a chemical hydrogen-generating reaction ($Zn \rightarrow 2H^+ \rightarrow Zn^{++} + H_2$) to take place between the electrolyte and the zinc anode when the cell is stored prior to use as well as during active use. These factors have made possible a sealed alkaline dry cell which does not generate appreciable gas or leak electrolyte during shelf life or when in use.

In my co-pending applications Serial Nos. 468,386, and 752,857, filed December 9, 1942, and June 6, 1947, respectively, now Patent Nos. 2,463,565 and 2,536,699, issued March 8, 1949, and January 2, 1951, respectively, I have disclosed and claimed a primary cell comprising a pair of electrodes and a solid alkaline electrolyte interposed between and in contact with said electrodes.

In my co-pending application Serial No. 662,001, filed April 13, 1946, now abandoned, I have disclosed and claimed an alkaline dry cell including a zinc can having an amalgamated zinc sheet lining the wall thereof and constituting the anode of the cell, said anode sheet being formed as to have a higher effective surface area than the inside wall of said can and having a multiplicity of perforations to provide electrolyte paths therethrough for a body of self-sustaining, non-flowing homogeneous gelled aqueous alkaline electrolyte contacting said anode and a cathode axially disposed within said can.

In my co-pending application Serial No. 671,200, filed May 21, 1946, I have disclosed and claimed a dry primary cell of flat or button-type like construction comprising an anode of compressed metal powder and an electrolyte element for the cell which may be formed of an aqueous alkaline solution which is immobilized by a compatible addition agent, preferably a material which converts the electrolyte into a gel.

In my co-pending application Serial No. 682,734, filed July 11, 1946, now Patent No. 2,542,575, issued February 20, 1951, I have disclosed and claimed alkaline dry cells comprising an amalgamated zinc anode, a pressed cathode-depolarizer body, and a body of alkaline electrolyte gel interposed between said anode and cathode. Preferably, the zinc anode is surrounded by and is in contact with a cell container formed of a metal inert to the electrolyte and having a low contact potential to amalgamated zinc. The quantity of zinc in the anode is balanced with the depolarizing capacity of the cathode so that both anode and cathode are consumed substantially simultaneously. In practice, a slight excess of oxide is used. When such a cell combination is employed with an alkaline electrolyte, it makes possible the provision of a sealed alkaline dry cell which is free of any tendency to electrolyte-leakage or appreciable gas generation during shelf life, current generating life and at end of life. Such a cell can safely be used in any sort of equipment without hazard or damage due to electrolyte leakage or cell disintegration, even if the cell is allowed to remain in the equipment long after the end of its useful life.

In my co-pending application Serial No. 703,386, filed October 15, 1946, now Patent No. 2,542,710, issued February 20, 1951, I have disclosed and claimed an alkaline dry cell comprising an anode layer of amalgamated zinc, a cathode layer of an oxygen-yielding compound in spaced parallel relation to said anode layer, and an electrolyte layer in the form of a self-supporting resilient alkaline gel sheet held under compression between said anode and cathode layers.

In my co-pending application, Serial No. 779,874, filed October 15, 1947, now Patent No. 2,542,576, issued February 20, 1951, I have disclosed and claimed an alkaline dry cell comprising an improved cathode assembly and a gel electrolyte of special composition and characteristics.

In my application filed concurrently herewith, Serial No. 793,406, I disclose and claim an alkaline dry cell having a gelled electrolyte of modified composition and a new anode construction.

The present application is related to my aforesaid Patent No. 2,422,045, and is a continuation-in-part of all of my aforesaid co-pending applications and constitutes an improvement thereover.

An object of the present invention is to provide a method for making an improved, immobilized electrolyte for alkaline cells.

A further object is to provide a method for making an immobilized electrolyte which also acts as a barrier to prevent migration of particles between cathode and anode in alkaline primary cells.

Another object is to provide an improved electrolyte which also acts as a spacer and barrier between the cathode and the anode in alkaline primary cells.

Other objects will be apparent from the following description and claims.

The invention has to do with a method of making electrolytes for alkaline cells which comprises adding to an alkaline electrolyte a quantity of a salt of carboxy-methyl cellulose and heating the mixture to a temperature of at least 100° C. and, preferably, to a point just below that at which the mixture starts to boil.

The drawing illustrates a preferred form of cell construction in which the electrolyte is employed:

Figure 1:
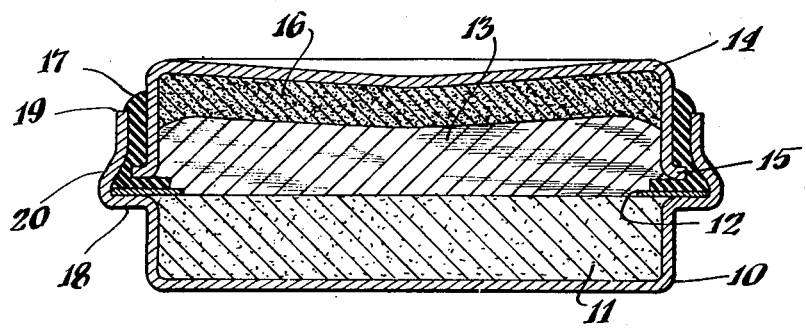
Fig. 1 is a sectional view of a flat or button-type dry cell.
Figure 2:
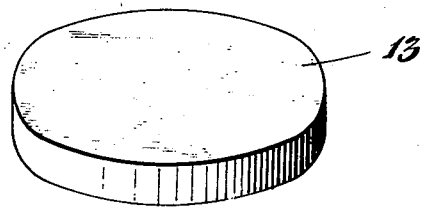
Fig. 2 is a perspective view of the electrolyte element.
Figure 3:
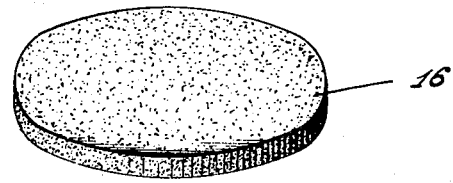
Fig. 3 is a perspective view of the anode element employed in the cell of Fig. 1.

Referring now more particularly to Figs. 1 to 3 of the drawing, reference numeral 10 denotes a shallow cup-shaped cathode container or shell formed of a suitable inert metal, such as steel. Within this container, there is compressed cathode-depolarizer body 11, such as an electronically conducting electrolytically-reducible oxygen-yielding compound having a smaller quantity of inert material of higher conductivity admixed thereto. The cathode body may be in the form of a prepressed pellet of 95% mercuric oxide and 5% graphite which is inserted into the cathode container and is consolidated therein by a higher pressure. Upon the upper surface of cathode body 11 rests an insulative ring or washer 12 of styrene.

Reference numeral 13 denotes a disc or slug of gelled electrolyte material. The preferred gel electrolyte for the cells of the present invention comprises an aqueous alkali metal hydroxide solution, preferably a KOH solution, which is gelled with an alkali metal salt of carboxy-methyl cellulose, such as sodium carboxy-methyl cellulose. Sodium carboxy-methyl cellulose is a cellulose derivative that is readily soluble or dispersible in water and is readily obtainable in the form of a white granular powder.

It is also contemplated, for long shelf life under adverse temperature conditions, that the electrolyte may, in some cases, contain a substantial proportion of dissolved alkali metal zincate.

The preferred range of concentration of the potassium hydroxide used in preparing the electrolyte is from thirty to fifty per cent (30 to 50%) KOH. Concentrations above and below these limits can be used but generally result in lower cell output efficiencies. For minimum attack on the amalgamated zinc anode by the electrolyte when the cell is standing on open circuit, the electrolyte should contain all the zinc it will take up at the temperatures to which the cell is to be subjected. It is preferred that the electrolyte should contain from about ten to twenty (10 to 20) grams of zinc for each one hundred (100) grams of KOH used in preparing the electrolyte.

One suitable electrolyte is formed of:

Chemically pure potassium hydroxide (88% KOH) _____ grams__ 100
Zinc oxide _____ do____ 16
Water _____ ml__ 100

The sodium carboxy-methyl cellulose is added to the electrolyte in proportions of 4 to 6 grams per 100 ml. of electrolyte solution, 5 grams being preferred. The range of usefulness for most applications is between 3 and 12 grams of cellulose to 100 milliliters of electrolyte. In preparing the electrolyte the potassium hydroxide is added to 25 ml. of water and the zinc oxide added. The mixture is stirred and heated to 180–190° C. and then allowed to cool to 110° C., after which 25 ml. of water is added and the solution stirred and cooled to 80° C. The remaining 50 ml. of water is added, a clear solution being obtained.

The manner of preparing the gelled electrolyte is of the highest importance in obtaining a material of the desired characteristics and which achieves the objects of the invention. The sodium carboxy-methyl cellulose is crushed and screened through a 40 mesh screen and is added slowly to the electrolyte solution, with constant stirring. This forms a viscid suspension which is converted to a gel, useful for the purpose of this invention, by heating to a temperature slightly below that at which the mixture starts to boil, generally about 117 to 120° C., depending upon the amount of water initially contained in the sodium carboxy-methyl cellulose. When so heated, a clear liquid solution is obtained which, upon cooling, will form a stiff, clear, homogeneous, solidified, self-supporting gel. Generally, I have found that the mixture should be heated to within 5 degrees centigrade of the point at which it starts to boil. While sodium carboxy-methyl cellulose is the preferred gelling agent, potassium carboxy-methyl cellulose and other compatible carboxy-methyl cellulose salts may be used.

The electrolyte described above may also be prepared without the addition of zinc oxide, one suitable electrolyte being formed of 100 grams chemically pure potassium hydroxide (88% KOH) and 100 milliliters of water.

In each case, the electrolyte and gel mixture must be heated to a temperature of at least 100° C. and, preferably, to a temperature of about 117–120° C.

The body of solidified, self-sustaining, nonflowing gel electrolyte produced by the above described method not only performs the usual function of cell electrolytes in undergoing electrochemical reaction with the electrodes and providing an electrolytically conductive path between them but also functions as a mechanical spacer and as a barrier to the travel of deleterious compounds, graphite particles and mercury between cathode and anode. The electrolyte being immobilized into a solidified gel has no free circulation which would carry particles from one electrode to the other. Gelled electrolytes made by merely dissolving carboxy-methyl cellulose into the electrolyte solution at room temperature are not self-sustaining and do not possess the necessary barrier action. Such electrolytes permit flowing or migration of the micronized graphite particles used in the cathode and also permit travel of the finely divided mercury produced by reduction of the mercuric oxide during cell operation. Furthermore, as such electrolytes tend to run, their use makes the cell sensitive to position; that is to say, if the cell is used or stored in an edgewise position, there is a tendency for the electrolyte to run down to the corners of the cell.

In preparing electrolyte discs or slugs 13, the preferred method is to pour the solution of the liquid electrolyte containing the gelling agent into a suitable mold heated to a temperature of 117° C. After cooling, the stiff gel sheet is removed from the mold and electrolyte discs are punched from it. Discs or balls of the gelled electrolyte of the desired weight and size can also be made with suitable molds. It is also possible to pour the hot liquid electrolyte with the gelling agent therein directly into the cell container which is heated to at least 100° C. and preferably to a temperature of about 120° C. and thereafter allowing the gel to cool and to consolidate in the cell. Alternatively, the adequately heated electrolyte may be poured into cold cell containers.

Anode container 14 is in the form of a shallow cup having an outwardly flaring flange 15 at its edge and formed of a metal inert to the electroylte and having, when amalgamated, a low contact potential to zinc. Examples of suitable materials for the anode container are copper, silver-plated copper, and silver and alloys thereof with other metals. Particularly good results are obtained with anode containers formed of commercial bronze which is an alloy of 90% copper and 10% zinc. Before assembling the cell, the inner surface of bronze can 14 is amalgamated, for example by pouring into it an acidified 3% mercuric nitrate solution having a temperature of 53° C. and maintaining the solution therein for five minutes. After amalgamation, the solution is poured off and the can is washed and dried.

In anode container 14 there is compressed a body of amalgamated zinc powder 16 constituting the anode of the cell. The preferred amalgamation process is to cover zinc powder with a 5% HCl solution heated to 75–80° C., add 10% of mercury in a fine stream and stir the entire mixture so as to distribute the amalgamation uniformly over the entire mass. The mixture is tumbled for one-half hour and water washed free of chlorides. The amalgamated zinc is then drained of water and rinsed in 2 successive baths of alcohol or acetone and dried by heat or air circulation. Continued tumbling during drying will speed up evaporation and also prevent formation of lumps. The pressed pellet of amalgamated zinc powder is inserted into the anode container and is consolidated therein by a pressure which is substantially higher than the pelleting pressure.

It is preferred to slightly predistort the top surface of anode shell 14 so that, upon consolidation of the amalgamated zinc pellet therein, the operative surface of the anode is rendered slightly convex, as this is set forth more fully in the co-pending application of Fred D. Williams, Jr., Serial No. 760,297, filed July 11, 1947, now Patent No. 2,499,239, for Flat Type Alkaline Dry Cell. It is also desirable that the corners of the anode button adjacent the gel electroylte be rounded and extended as shown in the drawing.

I have discovered that for best results the pressed zinc powder anode should be impregnated with electroylte prior to final assembly of the cell, otherwise it will absorb electroylte from the gel disc 13, causing it to dry and shrink, since the volume of the gel disc is proportional to its electrolyte content. Shrinking of the gel disc would detrimentally influence the good electrical contact between the anode body and the gel disc and in extreme cases would render the cell inoperative. This difficulty is completely avoided by preliminary impregnation of the anode with the electrolyte. The amount of impregnating electrolyte required depends upon the porosity of the anode; in general, the quantity used is about 7% of the volume of the anode.

Some absorption of electrolyte takes place also at the boundary surface of the gel disc 13 and the cathode-depolarizer body 11. However, by having the gel disc under compression, contact with the cathode body is assured, such contact being further improved by the high degree of adhesion between the gel disc and the cathode.

The electrolyte used for impregnating the zinc powder anode may have the same composition as that employed in the preparation of the gel disc, there being, of course, no gelling agent added to the electrolyte. Where the gelled electrolyte contains no zinc, however, I have found that further improved results are obtained by providing a substantial quantity of alkali metal zincate in the impregnating electrolyte. Thus, good results are obtained with impregnating electrolytes of the following composition:

(A)

Chemically pure potassium hydroxide (88% KOH) _____grams__ 125
Zinc oxide_____do____ 30
Water _____ml.__ 100

(B)

Chemically pure potassium hydroxide (88% KOH) _____grams__ 100
Zinc oxide_____do____ 16
Water _____ml.__ 100

The initial presence of a substantial quantity of alkali metal zincate (such as potassium zincate) in the impregnating electrolyte is instrumental in reducing the open circuit reactivity of the cell materials to a negligible value. This is essential in that it improves the shelf and also the useful life of the cell and becomes critically important when the cell is stored and used at elevated temperatures, such as are encountered in the tropics. When no zinc oxide is used in the preparation of the gel electrolyte disc 13, the disc is at least initially substantially free from alkali metal zincate.

In order to improve the penetration of liquid electrolyte into the pressed powder anode and particularly to improve retention of electrolyte therein, I have found it advantageous to mix with the zinc powder prior to pelleting, a small amount of inert powdered material, such as, magnesium silicate, magnesium hydroxide or other suitable material. The quantity used is from 1 to 5% of the anode weight, with 2% being the preferred amount.

In assembling the cell, gel disc 13 is inserted into anode container 14 into surface contact with the electrolyte-saturated zinc powder anode 16. An insulative sealing ring or grommet 17 of polyethylene is stretched around the flared edge 15 of the anode container and the said container is inserted into the open end of cathode container 10, resting on shoulder 18 of the cathode container. Thereupon, the upwardly extending edge 19 of the cathode container is pressed against the circumferential surface of the anode container, forming the crimp seal 20 shown in Fig. 1. Grommet 17 is strongly compressed between cooperating portions of the anode and cathode containers and constitutes therewith a substantially fluid-tight enclosure for the cell.

In a practical cell of the described character, the anode container was formed of commercial bronze sheet 0.020" thick, had a diameter of 1.160" and an overall height of 0.285". The pressed amalgamated zinc powder anode had a composition of 90% by weight zinc and 10% by weight mercury. It was pressed into a pellet weighing 4.7 grams, having a diameter of 1.05" and a height of .145" at a pressure of 5000 pounds per square inch and was consolidated in the anode container or shell at a pressure of 7000 pounds per square inch. The zinc powder anode was impregnated before its assembly with 0.25 to 0.30 ml. of an electrolyte prepared by the reaction of 125 parts by weight of KOH, 100 parts by weight of $H_2O$ and 30 parts by weight of ZnO or by the reaction product of 100 parts by weight of KOH, 100 parts by weight $H_2O$ and 16 parts by weight of ZnO.

The gel electrolyte was provided in the form of a disc or slug of a diameter of 0.950", having a thickness of 0.270" and weighed 4.5 grams. It was prepared by dissolving 100 parts by weight of KOH in 100 parts by weight of water, and converting the solution by heating into a tough, rubbery gel by the addition of 5 grams of sodium carboxy-methyl cellulose to each 100 ml. of the electrolyte solution. The sealing and insulating grommet was formed of polyethylene. The styrene spaced washer 12 interposed between the gel electrolyte and the cathode depolarizer had inner and outer diameters of 1.190" and .900", respectively, and was .005" thick.

The cathode container was formed of steel sheet .015" thick and was .152" deep measured from the bottom up to the shoulder. The cathode depolarizer was formed by mixing 95% by weight of mercuric oxide with 5% by weight of graphite. The mixture was pressed into a pellet 1.06" in diameter weighing 16 grams at a pressure of 12,000 pounds per square inch and the pellet was further compressed and consolidated in the cathode container or shell at a pressure of 30,000 pounds per square inch. The completed cell had an open circuit potential of 1.35 volts.

While the cell described in the foregoing comprises an anode shell of amalgamated commercial bronze and a cathode shell of steel, in some cases it may be desirable to form both of the shells of non-magnetic material. Thus, it is possible to form both shells from copper or silver, or of suitable non-magnetic alloys of copper or silver with other metals. For example, each of the shells may be formed of silver-plated copper whereby a cell of completely non-magnetic character is provided.

Although the present invention has been disclosed in connection with a few preferred embodiments thereof, variations and modifications may be resorted to by those skilled in the art without departing from the principles of the present invention. I consider all of these variations and modifications to be within the true spirit and scope of the present invention as disclosed in the foregoing description and defined by the appended claims.

What is claimed is:

1. The method of making an alkaline gel electrolyte for an electric current producing cell which comprises dissolving 3 to 12 grams of a salt of carboxy-methyl cellulose in each 100 milliliters of an aqueous solution of an alkali metal hydroxide and heating the mixture to a temperature of at least 100° C. but below the boiling point of the mixture whereby a self-supporting solidified and elastic gel body is obtained.

2. The method of making an alkaline gel electrolyte for an electric current producing cell which comprises dissolving 4 to 6 grams of sodium carboxy-methyl cellulose in each 100 milliliters of an aqueous solution of an alkali metal hydroxide and heating the mixture to a temperature of at least 100° C. and not more than within 5 degrees centigrade of the point at which the mixture starts to boil.

3. The method of making an alkaline gel electrolyte for an electric current producing cell which comprises dissolving 3 to 12 grams of sodium carboxy-methyl cellulose in each 100 milliliters of an aqueous solution of an alkali metal hydroxide and heating the mixture substantially to within 5 degrees centigrade of the point at which the mixture starts to boil, to form a clear solution, then cooling the solution to produce a clear, homogeneous, self-supporting gel.

4. The method of making an electrolyte-spacer element for alkaline dry cells which comprises dissolving an alkali metal salt of carboxy-methyl cellulose in an aqueous solution of an alkali metal hydroxide by heating the solution to a temperature of at least 100° C. but below the boiling point of the solution, pouring the hot solution into a flat mold, allowing the solution to cool and form into a gel therein, removing the resulting gel sheet from the mold and cutting or punching electrolyte-spacer elements therefrom.

5. The method of making an electrolyte element for alkaline cells which comprises adding to an aqueous solution containing thirty to fifty per cent (30 to 50%) KOH, approximately three to twelve (3 to 12) grams of a salt of carboxy-methyl cellulose and heating the mixture to a temperature of at least 100° C. but below the boiling point of the solution.

6. The method of making an electrolyte for alkaline cells which comprises adding to an aqueous potassium hydroxide solution, four to six (4 to 6) grams of sodium carboxy-methyl cellulose per one hundred (100) milliliters of solution and heating the mixture to within five degrees centigrade of the point at which it starts to boil.

7. The method of making an electrolyte element for alkaline cells which comprises adding to an aqueous solution containing thirty to fifty per cent (30 to 50%) KOH and ten to twenty (10 to 20) grams of chemically combined zinc per one hundred (100) grams of KOH used in preparing the solution, three to twelve (3 to 12) grams of a salt of carboxy-methyl cellulose and heating the mixture to within five degrees centigrade of the point at which it starts to boil.

8. The method of making an electrolyte for alkaline primary cells which comprises adding to about 100 milliliters of an aqueous potassium hydroxide solution about 4 to 6 grams of sodium carboxy-methyl cellulose, and heating the mixture to a temperature between about 117° C. and about 120° C.

SAMUEL RUBEN.

REFERENCES CITED

The following references are of record in the file of this patent:

UNITED STATES PATENTS

| Number | Name | Date |
|---|---|---|
| 1,137,226 | Manchester | Apr. 27, 1915 |

(Other references on following page)

UNITED STATES PATENTS

| Number | Name | Date |
|---|---|---|
| 1,201,481 | McGall et al. | Oct. 17, 1916 |
| 1,773,229 | Kip | Aug. 19, 1930 |
| 1,997,367 | Killian | Apr. 9, 1935 |
| 2,307,627 | Lawson | Jan. 5, 1943 |

FOREIGN PATENTS

| Number | Country | Date |
|---|---|---|
| 380,707 | France | Oct. 17, 1907 |
| 823,608 | France | Jan. 24, 1938 |

OTHER REFERENCES

Nye, assignor to United States of America as represented by the Secretary of War), application No. 603,739, filed July 7, 1945, published Oct. 11, 1949. (Copy of abstract in Division 60.)

Otto et al., "Low Temperature Dry Cells," Transactions of The Electrochemical Society, volume 90, 1946, pages 419–432, pages 424 and 425 relied upon. (Copy in Division 56.)

Hollabaugh et al., Indust. Eng. Chemistry, Oct. 1945, pages 943–944. (Copy in Library.)